United States Patent
Yonezawa et al.

(10) Patent No.: US 8,300,182 B2
(45) Date of Patent: Oct. 30, 2012

(54) DEPOLARIZING FILM, PROCESS FOR PRODUCING THE SAME, AND LIQUID-CRYSTAL DISPLAY

(75) Inventors: Hideyuki Yonezawa, Ibaraki (JP); Minoru Miyatake, Ibaraki (JP); Akinori Nishimura, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 234 days.

(21) Appl. No.: 12/921,251

(22) PCT Filed: Dec. 15, 2008

(86) PCT No.: PCT/JP2008/072769
§ 371 (c)(1),
(2), (4) Date: Sep. 7, 2010

(87) PCT Pub. No.: WO2009/113218
PCT Pub. Date: Sep. 17, 2009

(65) Prior Publication Data
US 2011/0007248 A1    Jan. 13, 2011

(30) Foreign Application Priority Data
Mar. 13, 2008  (JP) .................. 2008-063512

(51) Int. Cl.
*G02F 1/1335* (2006.01)
*B29D 11/00* (2006.01)
*G02B 5/30* (2006.01)

(52) U.S. Cl. ....... 349/96; 349/187; 264/1.1; 359/488.01

(58) Field of Classification Search ............... 349/56, 349/96, 99, 104, 122, 112, 187; 359/488, 359/488.01, 489.07, 486.01, 485.05; 264/1.1
See application file for complete search history.

(56) References Cited

U.S. PATENT DOCUMENTS

| | | | |
|---|---|---|---|
| 5,949,506 A * | 9/1999 | Jones et al. | 349/112 |
| 5,963,284 A * | 10/1999 | Jones et al. | 349/112 |
| 6,847,744 B2 * | 1/2005 | Azami et al. | 385/11 |
| 2011/0007248 A1 * | 1/2011 | Yonezawa et al. | 349/96 |

FOREIGN PATENT DOCUMENTS

| | | | |
|---|---|---|---|
| JP | 02-184804 A | | 7/1990 |
| JP | 2001-049533 A | | 2/2001 |
| JP | 2004-004464 A | | 1/2004 |
| JP | 2004-226503 A | | 8/2004 |
| JP | 2005-113291 A | | 4/2005 |
| JP | 2005-126854 A | | 5/2005 |
| JP | 2005-139573 A | | 6/2005 |
| JP | 2006-317733 A | | 11/2006 |
| JP | 2007-233244 A | | 9/2007 |
| JP | 2008-310310 A | | 12/2008 |

OTHER PUBLICATIONS

International Search Report of PCT/JP2008/072769, date of mailing Mar. 17, 2009.

* cited by examiner

*Primary Examiner* — Brian Healy
(74) *Attorney, Agent, or Firm* — Westerman, Hattori, Daniels and Adrian, LLP (57) ABSTRACT

Disclosed herein is a depolarizing film which is excellent in productivity and can have a large area. The depolarizing film is obtained by using birefringent very short fibers instead of inorganic birefringent crystals, such as calcite, for use in conventional depolarizing elements.

9 Claims, 5 Drawing Sheets

PRIOR ART

FIG. 3(b)

PRIOR ART

FIG. 3(c)

PRIOR ART

DEPOLARIZING FILM, PROCESS FOR PRODUCING THE SAME, AND LIQUID-CRYSTAL DISPLAY

FIELD OF THE INVENTION

The present invention relates to a depolarizing film, a process for producing the same, and a liquid-crystal display using the depolarizing film.

DESCRIPTION OF THE RELATED ART

A depolarizing element has the function of converting incident polarized light into unpolarized light to emit the unpolarized light, and is therefore used in measurement instruments using optical fibers or lasers. As a conventional depolarizing element, one obtained by interposing an adhesive, in which fine particles made of a birefringent material are dispersed, between cover glasses is known (Japanese Patent Application Laid-Open Publication No. JP 2-184804 A). As such a birefringent material, calcite has been long known but is difficult to mass-produce. Therefore, such a conventional depolarizing element has a problem in that it is poor in productivity. Under the circumstances, there has been a demand for a novel depolarizing element capable of solving such a problem.

SUMMARY OF THE INVENTION

It is therefore an object of the present invention to provide a depolarizing film which is excellent in productivity and can have a large area, a process for producing the same, and a liquid-crystal display using such a depolarizing film.

In order to achieve the above object, the present inventors have studied, and as a result have found that the use of birefringent very short fibers makes it possible to provide a depolarizing film excellent in productivity, a process for producing the same, and a liquid-crystal display using such a depolarizing film.

The summary of the present invention is as follows.

In a first preferred embodiment, a depolarizing film of the present invention comprises: a film made of a translucent resin; and a plurality of very short fibers dispersed in the film made of a translucent resin, wherein a refractive index $n_A$ of the very short fibers in a direction of a fiber axis is different from a refractive index $n_B$ of the very short fibers in a direction orthogonal to the fiber axis.

In a second preferred embodiment, the depolarizing film of the present invention is a film wherein when an average refractive index $n_0$ of the translucent resin (portion including no very short fibers) is defined as (extraordinary refractive index+ordinary refractive index×2)/3, at least one of the refractive index $n_A$ of the very short fibers in a direction of a fiber axis and the refractive index $n_B$ of the very short fibers in a direction orthogonal to the fiber axis is different from the average refractive index $n_0$ of the translucent resin (portion including no very short fibers).

In a third preferred embodiment, the depolarizing film of the present invention is a film wherein an absolute value of a difference between the refractive index $n_A$ of the very short fibers in a direction of a fiber axis and the refractive index $n_B$ of the very short fibers in a direction orthogonal to the fiber axis, $|n_A-n_B|$ is 0.005 to 0.3.

In a fourth preferred embodiment, the depolarizing film of the present invention comprises a film made of a translucent resin and a plurality of very short fibers dispersed in the film made of a translucent resin, each of which has a first birefringent region and a second birefringent region provided within the first birefringent region, wherein an average refractive index $n_0$ of the translucent resin (portion including no very short fibers), a refractive index $n_{A1}$ of the first birefringent region in a direction of a fiber axis, and a refractive index $n_{A2}$ of the second birefringent region in a direction of a fiber axis satisfy the relationship: $n_0<n_{A1}<n_{A2}$ or $n_{A2}<n_{A1}<n_0$.

In a fifth preferred embodiment, the depolarizing film of the present invention is a film wherein a difference between the refractive index $n_{A1}$ of the first birefringent region in a direction of a fiber axis and a refractive index $n_{B1}$ of the first birefringent region in a direction orthogonal to the fiber axis, $\Delta n_1 = n_{A1}-n_{B1}$ is 0.001 to 0.20, and a difference between the refractive index $n_{A2}$ of the second birefringent region in a direction of a fiber axis and a refractive index $n_{B2}$ of the second birefringent region in a direction orthogonal to the fiber axis, $\Delta n_2 = n_{A2}-n_{B2}$ is 0.01 to 0.30.

In a sixth preferred embodiment, the depolarizing film of the present invention is a film wherein the translucent resin (portion including no very short fibers) has an average refractive index $n_0$ of 1.3 to 1.7.

In a seventh preferred embodiment, the depolarizing film of the present invention is a film wherein the translucent resin (portion including no very short fibers) is a UV-curable resin.

In an eighth preferred embodiment, a process for producing the depolarizing film of the present invention comprises the steps of: (A) cutting stretched fibers to obtain a plurality of very short fibers, (B) dispersing the plurality of very short fibers obtained in the step A in a liquid material for forming a film made of a translucent resin to obtain a dispersion liquid, and (C) casting the dispersion liquid obtained in the step B in a film to form a cast layer and then solidifying or curing the cast layer to obtain a depolarizing film.

In a ninth preferred embodiment, a liquid-crystal display of the present invention comprises: a liquid-crystal panel; and the depolarizing film provided on a viewer-side of the liquid-crystal panel.

ADVANTAGES OF THE INVENTION

According to the present invention, it is possible to provide a depolarizing film which is excellent in productivity and can have a large area, a process for producing the same, and a liquid-crystal display using such a depolarizing film.

DESCRIPTION OF THE PREFERRED EMBODIMENTS

The present inventors have extensively studied in order to achieve the above object, and as a result have found that the use of birefringent very short fibers instead of inorganic birefringent crystals, such as calcite, for use in conventional depolarizing elements makes it possible to obtain a depolarizing film which is excellent in productivity and can have a large area.

The birefringent very short fibers to be used in the present invention are obtained by, for example, cutting stretched fibers, and therefore can be cheaply mass-produced. Further, by appropriately adjusting the stretching ratio of fibers, it is also possible to adjust the birefringence of resultant very short fibers. This makes it possible to obtain a depolarizing film having excellent properties.

[Depolarizing Film]

Figure 1:
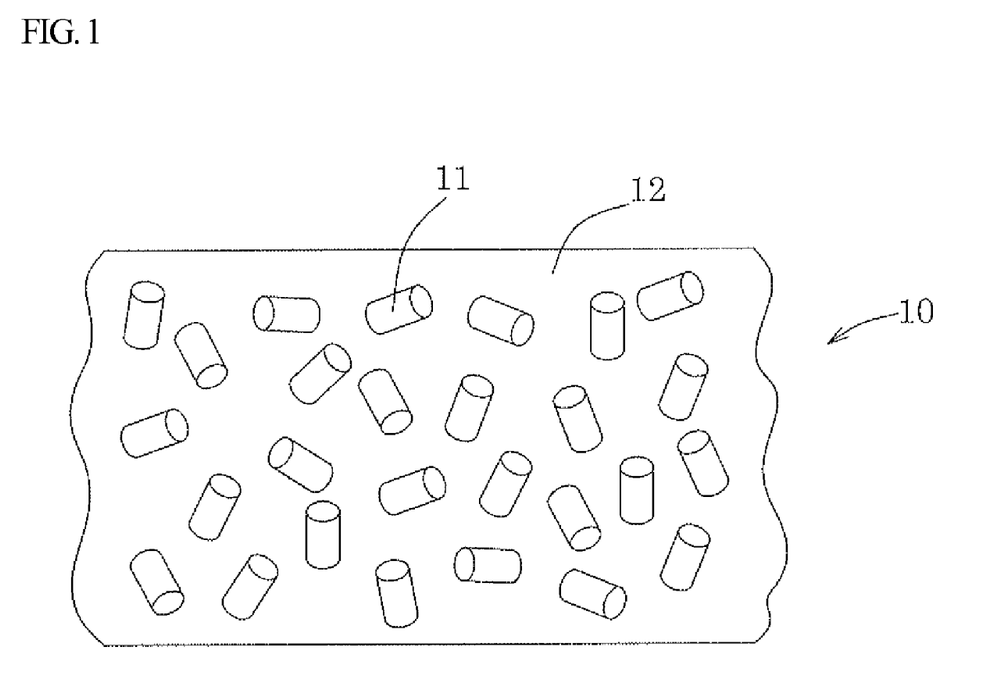
FIG. 1 is a schematic view of a depolarizing film according to the present invention.

As shown in FIG. 1, a depolarizing film 10 according to the present invention comprises: a translucent resin film 12; and a plurality of very short fibers 11 dispersed in the translucent resin film 12. By using the very short fibers 11, a threedimensional random distribution of fiber orientation in the thin depolarizing film 10 can be easily achieved. The very short fibers are birefringent, because the refractive index $n_A$ of the very short fibers in the direction of a fiber axis (also referred to as a "major axis direction") is different from the refractive index $n_B$ of the very short fibers in a direction orthogonal to the fiber axis (also referred to as a "minor axis direction"). Such a depolarizing film obtained by dispersing birefringent very short fibers in a translucent resin film can convert incident polarized light into unpolarized light to emit the unpolarized light.

The very short fibers are preferably dispersed in such a state that the distribution of orientation of the very short fibers (the distribution of orientation of fiber axis (i.e., major axis) of the very short fibers) is random in three dimensions. When the distribution of orientation of the very short fibers is closer to random in three dimensions, depolarization is more completely achieved. The number of the very short fibers oriented in a direction perpendicular to the plane of the film may be relatively small as long as the orientation of the very short fibers is random in the plane of the film.

The very short fibers to be used in the depolarizing film according to the present invention are usually birefringent, and therefore at least one of the refractive index $n_A$ of the very short fibers in the direction of a fiber axis and the refractive index $n_B$ of the very short fibers in a direction orthogonal to the fiber axis is different from the average refractive index $n_0$ of the translucent resin. Here, the average refractive index $n_0$ of the translucent resin is represented by the formula: (extraordinary refractive index+ordinary refractive index×2)/3. Therefore, the depolarizing film emits diffusion light, and therefore usually appears cloudy. The depolarizing film has a haze of, for example, 10% to 90%.

The depolarization effect of the depolarizing film is appropriately adjusted by adjusting the amount of the very short fibers to be added. The amount of the very short fibers to be added is preferably 5 to 70 wt%, more preferably 10 to 50 wt%, with respect to the total weight of the depolarizing film.

The thickness of the depolarizing film according to the present invention is preferably 5 to 300 μm, more preferably 10 to 200 μm.

[Very Short Fibers]

The very short fibers to be used in the present invention are birefringent, because the refractive index $n_A$ of the very short fibers in the direction of a fiber axis is different from the refractive index $n_B$ of the very short fibers in a direction orthogonal to the fiber axis. In the present invention, the word "birefringent" means that the absolute value of the difference between the refractive index $n_A$ of the very short fibers in the direction of a fiber axis and the refractive index $n_B$ of the very short fibers in a direction orthogonal to the fiber axis, that is, the absolute value of birefringence of the very short fibers $|n_A - n_B|$ is 0.001 or larger. In order to obtain a high depolarization effect, the absolute value of birefringence of the very short fibers $|n_A - n_b|$ is preferably 0.005 to 0.3, more preferably 0.01 to 0.2.

The very short fibers to be used in the present invention can be typically obtained by cutting fibers. In the present invention, the word "very short fiber" refers to one having a fiber length of 1 mm or less, and the word "fiber" refers to one having a fiber length larger than 1 mm. The fiber length of the very short fibers to be used in the present invention is preferably 2 μm to 500 μm, more preferably 10 μm to 100 μm.

The cross-sectional shape of the very short fibers to be used in the present invention perpendicular to a fiber axis is not particularly limited, and may be a circle, a polygon such as a triangle or a quadrangle, or a polygonal shape with rounded corners. The diameter of the very short fibers is preferably 2 μm to 50 μm, more preferably 2 μm to 30 μm. It is to be noted that when the cross-sectional shape of the very short fibers is not a circle, the longest span between two points in their cross section is defined as a diameter.

The material of the very short fibers to be used in the present invention is not particularly limited as long as it is translucent, but a polymer material is suitable from the viewpoint of excellent workability. Examples of such a polymer material include olefin-based polymers, vinyl alcohol-based polymers, (meth)acrylic polymers, ester-based polymers, styrene-based polymers, imide-based polymers, amide-based polymers, liquid-crystal polymers, and blended polymers of two or more of these polymers.

Figure 2A:
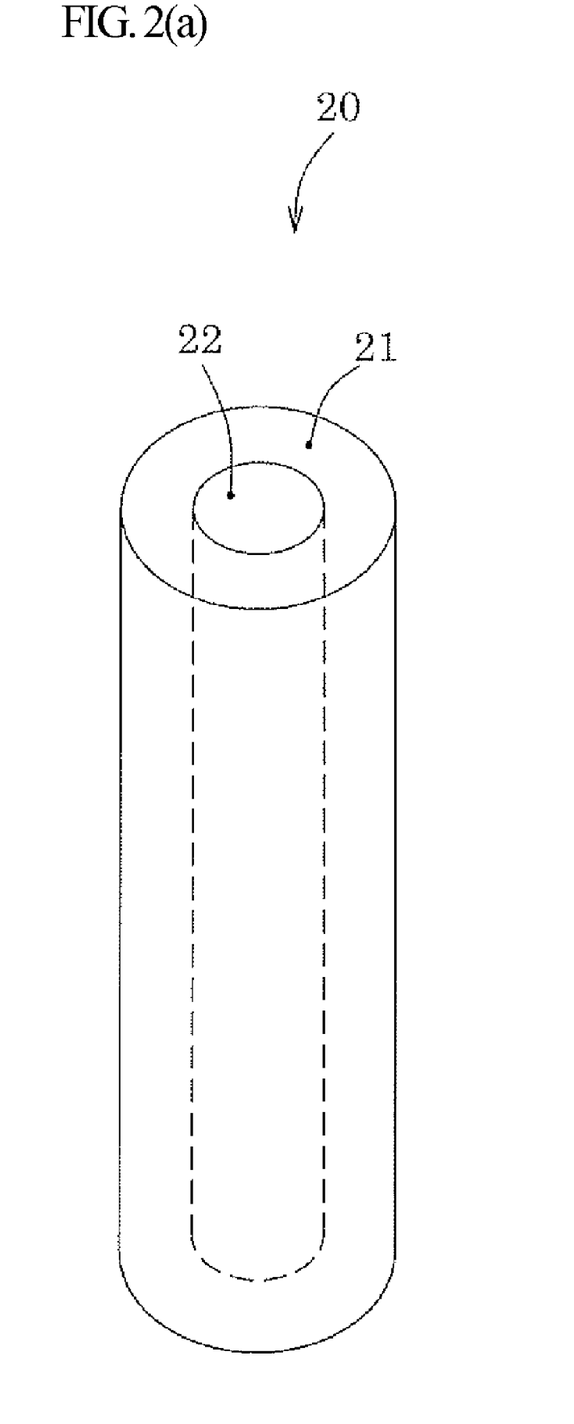
FIG. 2(a) is a schematic view of one example of a very short fiber to be used in the present invention and FIG. 2(b) is a schematic view of another example of a very short fiber to be used in the present invention.
Figure 2B:
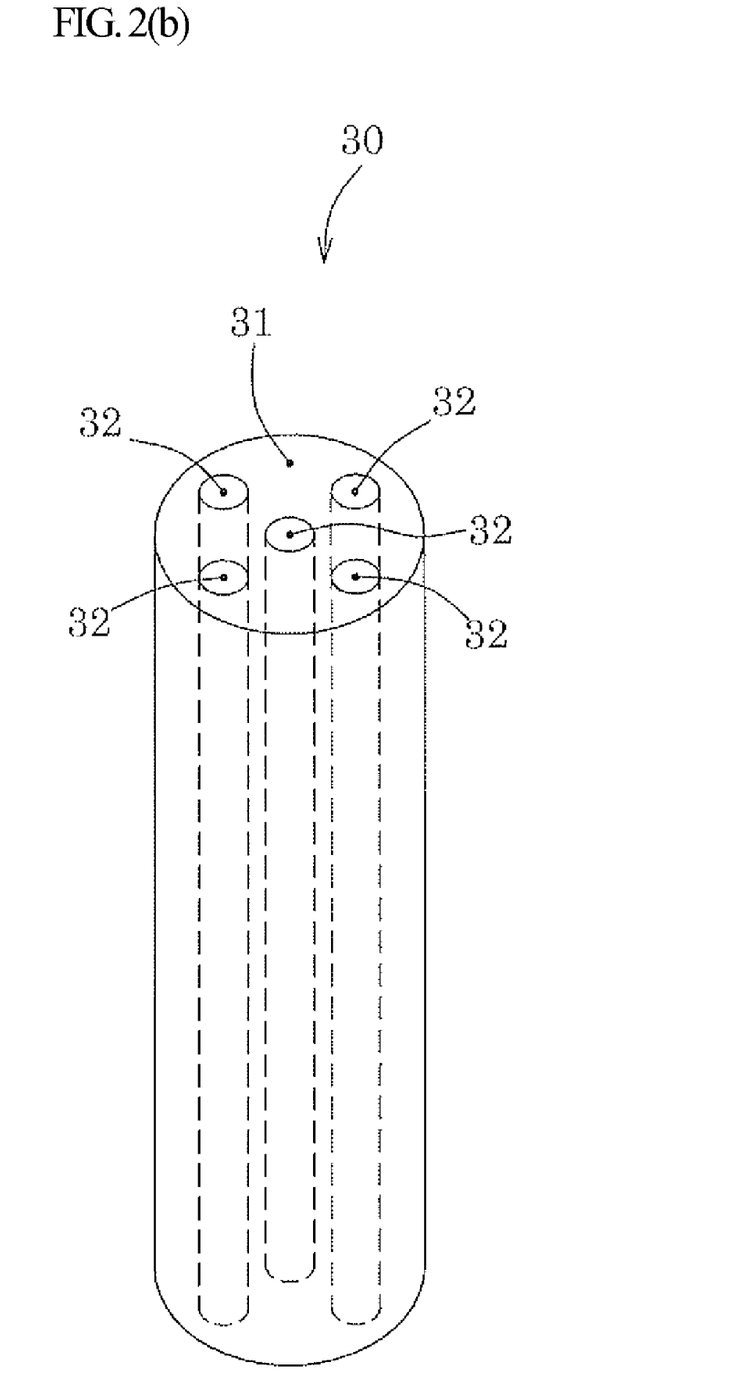

Each of the very short fibers to be used in the present invention preferably has a first birefringent region and a second birefringent region provided within the first birefringent region. Examples of such a very short fiber having two types of birefringent regions include a very short fiber 20 shown in FIG. 2(*a*) having a so-called "core-sheath structure" and a very short fiber 30 shown in FIG. 2(*b*) having a so-called "sea-island structure". The very short fiber 20 has a first birefringent region 21 and a single second birefringent region 22 provided within the first birefringent region 21. The very short fiber 30 has a first birefringent region 31 and two or more second birefringent regions 32 provided within the first birefringent region 31.

Although both the very short fiber shown in FIG. 2(*a*) and the very short fiber shown in FIG. 2(*b*) are composed of only the first and second birefringent regions, the very short fibers to be used in the present invention may have a third birefringent region (not shown) made of any material and/or an optically-isotropic region (not shown) made of any material. Further, the second birefringent region of the very short fiber shown in FIG. 2(*a*) and the second birefringent regions of the very short fiber shown in FIG. 2(*b*) are all cylindrical, but the shape of the second birefringent region is not particularly limited, and may be a polygonal prism such as a triangular prism or a quadrangular prism or a polygonal prism with rounded corners. Further, the second birefringent regions do not always need to be evenly distributed within the first birefringent region, and may be unevenly distributed within the first birefringent region.

The first and second birefringent regions are made of two or more materials selected from, for example, the above-mentioned polymer materials for forming the very short fibers.

The very short fibers to be used in the present invention preferably have such a sea-island structure as shown in FIG. 2(*b*), in which two or more second birefringent regions are provided within a first birefringent region. By allowing the very short fibers to be used in the present invention to have such a sea-island structure, it is possible to reduce the diameter of the second birefringent regions, thereby increasing the number of scattering points. This makes it possible to obtain a depolarizing film having a high depolarization effect.

The diameter of the second birefringent region of the very short fibers to be used in the present invention is preferably 0.1 μm to 10 μm, more preferably 0.5 μm to 5 μm.

In a case where the depolarizing film according to the present invention uses very short fibers each having a first birefringent region and a second birefringent region provided within the first birefringent region, the average refractive index $n_0$ of the translucent resin, the refractive index $n_{A1}$ of the first birefringent region in the direction of a fiber axis, and the refractive index n of the second birefringent region in the direction of a fiber axis preferably satisfy the relationship:

$n_0<n_{A1}<n_{A2}$ or $n_{A2}<n_{A1}<n_0$. In the case of such a depolarizing film in which the refractive index is changed stepwise, the difference in refractive index at the interface between two members is small, and therefore interfacial reflection occurring at the interface between the translucent resin and the very short fibers can be reduced so that backscattering may be reduced.

The birefringence of the first birefringent region, that is, the difference between the refractive index $n_{A1}$ of the first birefringent region in the direction of a fiber axis and the refractive index $n_{B1}$ of the first birefringent region in a direction orthogonal to the fiber axis ($\Delta n_1 = n_{A1} - n_{B1}$) is preferably 0.001 to 0.20, more preferably 0.001 to 0.10.

The birefringence of the second birefringent region, that is, the difference between the refractive index $n_{A2}$ of the second birefringent region in the direction of a fiber axis and the refractive index $n_{B2}$ of the second birefringent region in a direction orthogonal to the fiber axis ($\Delta n_2 = n_{A2} - n_{B2}$) is preferably 0.01 to 0.30, more preferably 0.02 to 0.20. By setting the birefringence of each of the first and second birefringent regions to a value within the above range, it is possible to obtain a depolarizing film having a higher depolarizing effect.

[Translucent Resin Film]

The translucent resin film to be used in the present invention is a film obtained by molding a translucent rein into a film. In the translucent resin film, a plurality of very short fibers are dispersed. The transmittance of the translucent resin (not containing very short fibers) at a wavelength of 546 nm is preferably 50% or higher, more preferably 70% or higher.

The translucent resin film to be used in the present invention can be made of any material excellent in transparency as long as a plurality of very short fibers can be immobilized therein in a dispersed state. Examples of such a material for forming a translucent resin film include UV-curable resins, cellulose-based polymers, and norbornene-based polymers. The translucent resin film is preferably made of an energy-ray curable resin, more preferably of a UV-curable resin. An energy-ray curable resin, especially a UV-curable resin can be rapidly molded into a film, which contributes to productivity growth.

The average refractive index $n_0$ of the translucent resin (not containing very short fibers) is preferably 1.3 to 1.7, more preferably 1.4 to 1.6. If necessary, the average refractive index $n_0$ of the translucent resin can be increased or decreased by changing the kind of organic group to be introduced into the translucent resin and/or the amount of an organic group contained in the translucent resin. For example, the average refractive index of the translucent resin can be increased by introducing a cyclic aromatic group (e.g., a phenyl group) into the translucent resin. On the other hand, the average refractive index of the translucent resin can be decreased by introducing an aliphatic group (e.g., a methyl group) into the translucent resin.

The translucent resin to be used in the present invention is preferably an optically-isotropic resin hardly having refractive index anisotropy. In the present invention, the word "optically-isotropic resin" refers to a resin whose birefringence (i.e., the difference between an extraordinary refractive index and an ordinary refractive index) is less than 0.001.

It is preferred that the very short fibers dispersed in the translucent resin film are completely embedded in the translucent resin film. However, some of the very short fibers dispersed in the translucent resin film may be exposed at the surface of the translucent resin film due to incomplete embedding as long as they are immobilized.

The translucent resin film may contain any additive. Examples of such an additive include surfactants, cross-linking agents, antioxidants, and antistatic agents. The amount of the additive contained in the translucent resin film is not particularly limited, but is usually 5 wt% or less with respect to the total weight of the depolarizing film.

[Depolarizing Film Production Process]

A process for producing a depolarizing film according to the present invention comprises the following steps A to C. The step A is cutting stretched fibers to obtain a plurality of very short fibers having a refractive index $n_A$ in the direction of a fiber axis and a refractive index $n_B$, which is different from the refractive index $n_A$, in a direction orthogonal to the fiber axis. The step B is dispersing the very short fibers obtained in the step A in a liquid material, from which a translucent resin film can be formed, to obtain a dispersion liquid. The step C is casting the dispersion liquid obtained in the step B into a film to form a cast layer and then solidifying or curing the cast layer to obtain a depolarizing film. If necessary, the depolarizing film production process according to the present invention may further comprise another step in addition to the steps A to C.

[Step A]

As described above, the step A is cutting stretched fibers to obtain a plurality of very short fibers having a refractive index $n_A$ in the direction of a fiber axis and a refractive index $n_B$, which is different from the refractive index $n_A$, in a direction orthogonal to the fiber axis.

The unstretched fiber can be produced by extruding a melted polymer from a spinning nozzle. A fiber having two or more types of birefringent regions can be produced by extruding, for example, two different melted polymer materials from a nozzle for sea-island composite fiber spinning. Alternatively, a fiber having two or more types of birefringent regions may be produced by coating the surface of a single-structure fiber with another material.

A method for stretching the unstretched fiber is not particularly limited. For example, a heat stretching method or a swelling-stretching method may be employed. Alternatively, tension may be applied to the undrawn fiber in the spinning step. By stretching the unstretched fiber, it is possible to obtain a birefringent fiber having a refractive index $n_A$ in the direction of a fiber axis and a refractive index $n_B$, which is different from the refractive index $n_A$, in a direction orthogonal to the fiber axis. Further, the absolute value of birefringence of the fiber, that is, the absolute value of the difference between $n_A$ and $n_B$, $|n_A - n_B|$ can be adjusted by changing the degree of stretching.

A method for obtaining very short fibers by cutting fibers is not particularly limited. For example, a fiber bundle obtained by arranging a plurality of fibers in parallel with each other may be cut by a cutting blade. Very short fibers obtained by cutting birefringent fibers are also birefringent.

Alternatively, a method described in Japanese Patent Application Laid-Open Publication No. JP 2005-113291 A may be employed. More specifically, a fiber bundle is impregnated with a liquid or gaseous embedding material, and then the embedding material is solidified by decreasing the temperature to integrate the fiber bundle with the embedding material to form a single unit, and then the end face of the single unit is cutting-worked at a low temperature, and then the embedding material is removed by increasing the temperature to obtain very short fibers having a length of about 0.005 mm to 1 mm.

Alternatively, a method described in Japanese Patent Application Laid-open Publication No. JP 2005-126854 A may be employed. More specifically, a fiber bundle is impregnated with a liquid or gaseous embedding material, and then the embedding material is solidified by decreasing the temperature to integrate the fiber bundle with the embedding material to form a single unit, and then the end faces of the thus prepared two or more single units are planed at a low temperature, and then the embedding material is removed by increasing the temperature to obtain very short fibers having a length of about 0.005 mm to 1 mm.

Alternatively, a method described in Japanese Patent Application Laid-Open Publication No. JP 2005-139573 A may be employed. More specifically, a plurality of fiber bundles arranged so as not to come into contact with each other are impregnated with a liquid or gaseous embedding material, and then the embedding material is solidified by decreasing the temperature to integrate the fiber bundles with the embedding material to form a single unit, and then the end face of the single unit is cutting-worked at a low temperature, and then the embedding material is removed by increasing the temperature to obtain very short fibers having a length of about 0.005 mm to 1 mm.

[Step B]

As described above, the step B is dispersing the very short fibers obtained in the step A in a liquid material, from which a translucent resin film can be formed, to obtain a dispersion liquid.

The liquid material for forming a translucent resin film is not particularly limited. For example, a solution obtained by dissolving a translucent resin in a solvent or a solvent-free or solvent-containing energy-ray curable resin liquid is used.

A method for preparing the dispersion liquid is not particularly limited. For example, the dispersion liquid may be prepared by adding the above-described liquid material to the very short fibers placed in a container little by little under stirring or by adding the very short fibers to the above-described liquid material placed in a container little by little under stirring.

[Step C]

As described above, the step C is casting the dispersion liquid obtained in the step B into a film to form a cast layer and then solidifying or curing the cast layer to obtain a depolarizing film.

A method for casting the dispersion liquid into a film is not particularly limited, and a coating method using any coater may be employed. Examples of a coater used in a coating method include a slot orifice coater, a die coater, a bar coater, and a curtain coater.

In the step C, the cast layer is solidified or cured by any method. In the present invention, the word "solidified" means that a softened or melted resin (polymer) is solidified by cooling or a resin (polymer) dissolved in a solvent is solidified by removing the solvent, and the word "cured" means that a resin (polymer) is cross-linked by exposure to heat, catalyst, light, or radiation and therefore becomes hardly soluble or meltable. The conditions for solidifying or curing are appropriately determined depending on the kind of translucent resin used. In a case where a UV-curable resin is used as the translucent resin, the conditions for curing the UV-curable resin are to expose it to UV light at an illuminance of preferably 5 mW/cm$^2$ to 1,000 mW/cm$^2$ so that the integral amount of light becomes preferably 100 mJ/cm$^2$ to 5000 mJ/cm$^2$.

[Usage of Depolarizing Film]

The depolarizing film according to the present invention is suitable for use in liquid-crystal panels for, for example, computers, copiers, mobile phones, watches, digital cameras, portable information terminals, portable game machines, video cameras, TV sets, microwave ovens, car navigation systems, car audio systems, monitors for stores, surveillance monitors, and medical monitors.

[Liquid-Crystal Display]

A liquid-crystal display according to the present invention comprises: a liquid-crystal panel; and the depolarizing film according to the present invention provided on the viewer side of the liquid-crystal panel. The liquid-crystal display having such a structure makes it possible for a user wearing polarized sunglasses to visually identify clear images displayed on a screen from every angle.

Figure 3A:
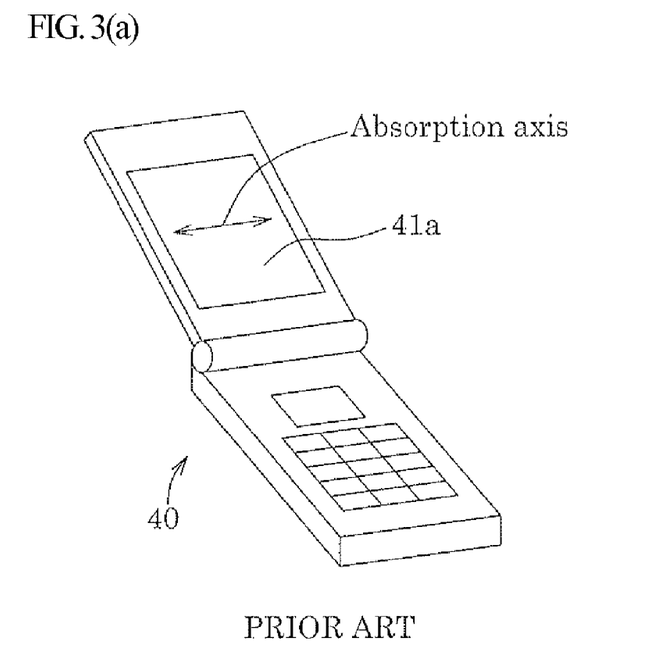
FIGS. 3(a) and 3(b) are schematic views of a mobile phone and FIG. 3(c) is a schematic view of polarized sunglasses.
Figure 3B:
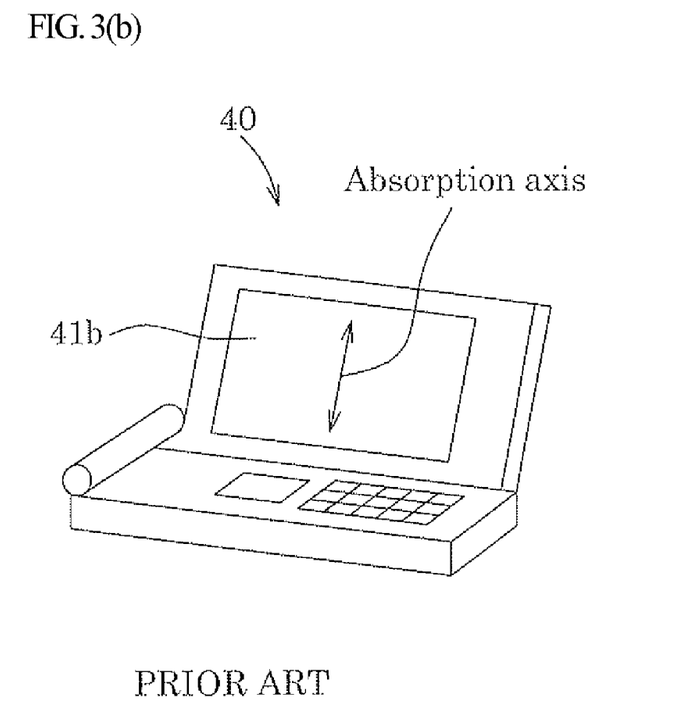
Figure 3C:
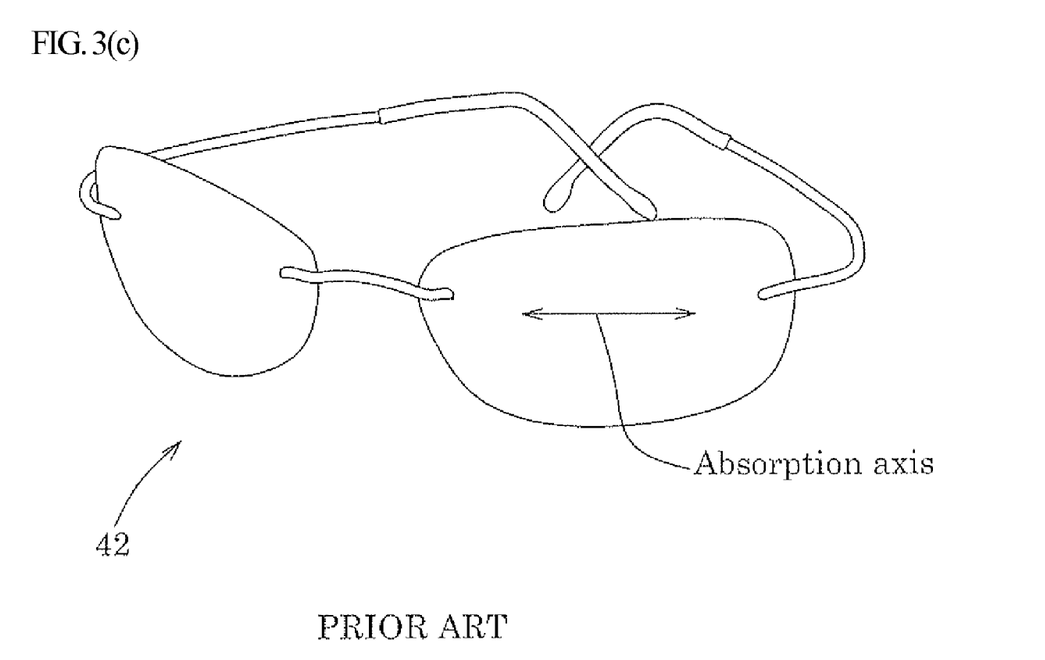

A general liquid-crystal display emits polarized light passing through a polarizing plate attached to the top surface of a liquid-crystal panel. Therefore, it is difficult for a user wearing polarized sunglasses to visually identify images displayed on a screen from an angle allowing the absorption axis of the polarizing plate to be orthogonal to the absorption axis of the polarized sunglasses. As shown in FIGS. 3(a) and 3(b), a recent mobile phone 40 has an open/close system allowing its liquid-crystal display to be used in both vertical screen mode (i.e., a liquid-crystal display 41a) and horizontal screen mode (i.e., a liquid-crystal display 41b). For example, when a user creates a mail message, the mobile phone 40 is used in vertical screen mode as shown in FIG. 3(a), and when a user watches TV, the mobile phone 40 is used in horizontal screen mode as shown in FIG. 3(b). However, when a user wearing polarized sunglasses 42 shown in FIG. 3(c) uses the mobile phone 40, the display characteristics of one of the conventional liquid-crystal display 41a used in vertical screen mode and the conventional liquid-crystal display 41b used in horizontal screen mode are inferior to the other. In a case where the absorption axis of a polarizing plate provided on the viewer side of the liquid-crystal display 41a is parallel to an arrow shown in FIG. 3(a), and the absorption axis of a polarizing plate provided on the viewer side of the liquid-crystal display 41b is parallel to an arrow shown in FIG. 3(b), and the absorption axis of the polarized sunglasses 42 is parallel to an arrow shown in FIG. 3(c), a user wearing the polarized sunglasses 42 can visually identify images displayed on the liquid-crystal display 41a shown in FIG. 3(a) without any problem because the absorption axis of the liquid-crystal display 41a is parallel to the absorption axis of the polarized sunglasses 42, but can hardly visually identify images displayed on the liquid-crystal display 41b shown in FIG. 3(b) because the absorption axis of the liquid-crystal display 41b is orthogonal to the absorption axis of the polarized sunglasses 42, which makes the screen of the liquid-crystal display 41b look dark.

On the other hand, as described above, the liquid-crystal display according to the present invention has the depolarizing film according to the present invention provided on the viewer side (i.e., on the outside of a polarizing plate) of the liquid-crystal panel, and therefore converts polarized light into unpolarized light to emit the unpolarized light. Therefore, a user can visually identify clear images displayed on the liquid-crystal display according to the present invention irrespective of whether the user wears polarized sunglasses.

The liquid-crystal panel comprises: a liquid-crystal cell as a display element; and a polarizing plate attached to at least the viewer-side surface of the liquid-crystal cell. In a case where the liquid-crystal cell is of a transmission type, a polarizing plate is attached to the other surface of the liquid-crystal cell opposite to the viewer-side surface. In a case where the liquid-crystal cell is of a reflection type, a reflector plate is attached to the other surface of the liquid-crystal cell opposite to the viewer-side surface.

When the depolarizing film according to the present invention provided in the liquid-crystal display according to the present invention is located on the top surface of a display screen, the effect of reducing the glare of the screen due to the reflection of light from a room lighting fixture or the like can be obtained in addition to the above-described merits for users wearing polarized sunglasses.

EXAMPLES

Example 1

An ethylene/vinyl alcohol copolymer (manufactured by Nippon Synthetic Chemical Industry Co., Ltd. under the trade name of "SoarnoL DC321B", melting point: 181° C.) was melted at 270° C., and was then charged into a nozzle for single-structure fiber spinning and spun at a spinning rate of 600 m/min to obtain a spinning filament having a diameter of 30 µm. The spinning filament was stretched 4 times its initial length in warm water at 60° C. to obtain a continuous fiber having a diameter of 15 µm.

The continuous fibers were arranged in parallel with each other to prepare a fiber bundle. The fiber bundle was embedded and fixed in a polyvinyl alcohol resin and cut by a cutting blade, and then the polyvinyl alcohol resin was melted by warm water and removed to obtain very short fibers having a fiber length of 30 µm.

A number of the aforementioned very short fibers were prepared, and were then dispersed in a polyester acrylate-based UV-curable resin liquid (manufactured by Sartomer under the trade name of "CN2273") to prepare a dispersion liquid. The dispersion liquid was cast on the surface of a polyethylene terephthalate film to form a cast layer. Then, the cast layer was cured by irradiation with UV light (illuminance: 40 mW/cm$^2$, integral amount of light: 1,000 mJ/cm$^2$), and then the polyethylene terephthalate film was peeled off to obtain a depolarizing film having a thickness of 150 µm. The amount of the very short fibers contained in the depolarizing film was 30 wt% with respect to the total weight of the depolarizing film. The refractive indices of the components of the depolarizing film are shown in Table 1, and the optical characteristics of the depolarizing film are shown in Table 2.

Example 2

An ethylene/vinyl alcohol copolymer (manufactured by Nippon Synthetic Chemical Industry Co., Ltd. under the trade name of "Soarnol DC321B", melting point: 181° C.) and a propylene-excessive ethylene/propylene copolymer (manufactured by Japan Polypropylene Corporation under the trade name of "OX1066A", melting point: 138° C.) were melted at 270° C. and 230° C., respectively, and were then charged into a nozzle for sea-island composite fiber spinning (number of islands per fiber cross section: 37) and spun at a spinning rate of 600 m/min to obtain a spinning filament having a diameter of 30 µm.

The spinning filament was stretched 4 times its initial length in warm water at 60° C. to obtain a continuous fiber having a diameter of 15 µm. The cross section of the continuous fiber was observed with an electron microscope, and as a result it was confirmed that the continuous fiber had a sea-island structure in which cylindrical second birefringent regions (islands, diameter of cross section: 1 µm) made of an ethylene/vinyl alcohol copolymer were dispersed in a cylindrical first birefringent region (sea, diameter of cross section: 15 µm) made of an ethylene/propylene copolymer.

Then, a depolarizing film having a thickness of 150 µm was prepared in the same manner as in Example 1 except that the continuous filaments obtained in Example 2 were used instead of the continuous filaments obtained in Example 1. The refractive indices of the components of the depolarizing film are shown in Table 1 and the optical characteristics of the depolarizing film are shown in Table 2.

TABLE 1

| | Refractive Index $n_0$ of Translucent Resin | First Birefringent Region of Very Short Fibers | | Second Birefringent Region of Very short Fibers | |
|---|---|---|---|---|---|
| | | $n_{A1}$ | $n_{B1}$ | $n_{A2}$ | $n_{B2}$ |
| Example 1 | 1.48 | 1.57 | 1.52 | Absence | Absence |
| Example 2 | 1.48 | 1.51 | 1.49 | 1.57 | 1.52 |

$n_0$ = average refractive index of translucent resin
$n_{A1}$ = refractive index of first birefringent region in fiber axis direction
$n_{B1}$ = refractive index of first birefringent region in direction orthogonal to fiber axis
$n_{A2}$ = refractive index of second birefringent region in fiber axis direction
$n_{B2}$ = refractive index of second birefringent region in direction orthogonal to fiber axis

TABLE 2

| | Presence or Absence of Second Birefringent Region | Depolarizing Film | |
|---|---|---|---|
| | | Haze | Backscattering |
| Example 1 | Absence | 80% | Large |
| Example 2 | Presence | 80% | Small |

Example 3

The depolarizing film prepared in Example 2 was attached to the viewer-side surface of a liquid-crystal panel of a commercially-available mobile phone (manufactured by NTT DOCOMO Inc. under the trade name of "FOMA P905i") to produce a liquid-crystal display. The display characteristics of the liquid-crystal display are shown in Table 3.

Comparative Example

A liquid-crystal panel of a commercially-available mobile phone that is the same as used in Example 3 was used as a liquid-crystal display without attaching any depolarizing film on the viewer-side surface of the liquid-crystal panel. The display characteristics of the liquid-crystal display are shown in Table 3.

TABLE 3

| | Presence or Absence of Depolarizing Film | Display Characteristics of Liquid-Crystal Display |
|---|---|---|
| Example 3 | Presence | Not Changed |
| Comparative Example | Absence | Darkened |

[Evaluation]

Images displayed on the screen of the liquid-crystal display prepared in Example 3 were not changed even when the screen was rotated from vertical to horizontal orientation. On the other hand, images displayed on the screen of the liquid-crystal display prepared in Comparative Example were normally visually identified when the screen was in a vertical orientation, but when the screen was in a horizontal orientation, the screen was darkened so that images displayed on the screen were hardly visually identified. From the result, it has been confirmed that the depolarizing film according to the present invention is remarkably effective.

[Measurement Methods]

[Haze]

A haze was measured in accordance with JIS K 7136:2000 using a hazemeter (manufactured by Murakami Color Research Laboratory under the trade name of "HM-150").

[Average Refractive Index of Fibers]

A refractive index at room temperature (25° C.) at a wavelength of 546 nm was measured by Becke line method using a polarizing microscope manufactured by Olympus Corporation.

[Refractive Index of Translucent Resin]

A refractive index at room temperature (25° C.) at a wavelength of 546 nm was measured using a prism coupler manufactured by Sairon Technology Inc.

[Backscattering]

A black acrylic plate was attached to the back surface of a depolarizing film, and then the surface of the depolarizing film was illuminated with a white fluorescent lamp to visually observe the amount of reflected light.

There have thus been shown and described a novel depolarizing film, a process for producing the same, and a liquid-crystal display, which fulfill all the objects and advantages sought therefor. Many changes, modifications, variations, combinations and other uses and applications of the subject invention will, however, become apparent to those skilled in the art after considering this specification and the accompanying drawings which disclose the preferred embodiments thereof. All such changes, modifications, variations and other uses and applications which do not depart from the spirit or scope of the invention are deemed to be covered by the invention, which is to be limited only by the claims which follow.

What is claimed is:

1. A depolarizing film comprising:
a film made of a translucent resin; and
a plurality of very short fibers dispersed in the film made of a translucent resin, wherein a refractive index $n_A$ of the very short fibers in a direction of a fiber axis is different from a refractive index $n_B$ of the very short fibers in a direction orthogonal to the fiber axis.

2. The depolarizing film according to claim 1, wherein when an average refractive index $n_0$ of the translucent resin is defined as (extraordinary refractive index +ordinary refractive index+2)/3, at least one of the refractive index $n_A$ of the very short fibers in a direction of a fiber axis and the refractive index $n_B$ of the very short fibers in a direction orthogonal to the fiber axis is different from the average refractive index $n_0$ of the translucent resin.

3. The depolarizing film according to claim 2, wherein an absolute value of a difference between the refractive index $n_A$ of the very short fibers in a direction of a fiber axis and the refractive index $n_B$ of the very short fibers in a direction orthogonal to the fiber axis, $|n_A-n_B|$ is 0.005 to 0.3.

4. A depolarizing film comprising:
a film made of a translucent resin; and
a plurality of very short fibers dispersed in the film made of a translucent resin, each of which has a first birefringent region and a second birefringent region provided within the first birefringent region, wherein an average refractive index $n_0$ of the translucent resin, a refractive index $n_{A1}$ of the first birefringent region in a direction of a fiber axis, and a refractive index $n_{A2}$ of the second birefringent region in a direction of a fiber axis satisfy the relationship: $n_0<n_{A1}<n_{A2}$ or $n_{A2}<n_{A1}<n_0$.

5. The depolarizing film according to claim 4, wherein a difference between the refractive index $n_{A1}$ of the first birefringent region in a direction of a fiber axis and a refractive index $n_{B1}$ of the first birefringent region in a direction orthogonal to the fiber axis, $\Delta n_1 = n_{A1}-n_{B1}$ is 0.001 to 0.20, and a difference between the refractive index $n_{A2}$ of the second birefringent region in a direction of a fiber axis and a refractive index $n_{B2}$ of the second birefringent region in a direction orthogonal to the fiber axis, $\Delta n_2 = n_{A2}-n_{B2}$ is 0.01 to 0.30.

6. The depolarizing film according to claim 1 or 4, wherein the translucent resin has an average refractive index $n_0$ of 1.3 to 1.7.

7. The depolarizing film according to claim 1 or 4, wherein the translucent resin is a UV-curable resin.

8. A process for producing the depolarizing film according to any one of claims 1 to 5, comprising the steps of:
(A) cutting stretched fibers to obtain a plurality of very short fibers;
(B) dispersing the plurality of very short fibers obtained in the step A in a liquid material for forming a film made of a translucent resin to obtain a dispersion liquid, and
(C) casting the dispersion liquid obtained in the step B in a film to form a cast layer and then solidifying or curing the cast layer to obtain a depolarizing film.

9. A liquid-crystal display comprising:
a liquid-crystal panel; and
the depolarizing film according to any one of claims 1 to 5 provided on a viewer-side of the liquid-crystal panel.

* * * * *